United States Patent [19]

Bowers

[11] Patent Number: 4,822,056
[45] Date of Patent: Apr. 18, 1989

[54] ADJUSTABLE ROTARY SHAFT SEAL

[75] Inventor: David Bowers, Bath, Me.

[73] Assignee: Woodex Bearing Company, Inc., Georgetown, Me.

[21] Appl. No.: 262,740

[22] Filed: Oct. 26, 1988

Related U.S. Application Data

[63] Continuation-in-part of Ser. No. 124,087, Dec. 23, 1987.

[51] Int. Cl.[4] .............................................. F16J 15/38
[52] U.S. Cl. ........................................ 277/83; 277/65; 277/176
[58] Field of Search ................... 277/81 R, 81 S, 82, 277/83, 85, 65, 173, 176

[56] References Cited

U.S. PATENT DOCUMENTS

| | | | |
|---|---|---|---|
| 2,491,233 | 12/1949 | Vedovell | 277/81 R |
| 2,912,265 | 11/1959 | Brummer | 277/83 X |
| 3,988,026 | 10/1976 | Kemp | 277/65 X |
| 4,522,410 | 6/1985 | Holzer | 277/176 X |

FOREIGN PATENT DOCUMENTS

| | | | |
|---|---|---|---|
| 272226 | 3/1914 | Fed. Rep. of Germany | 277/81 R |
| 1487514 | 5/1967 | France | 277/176 |
| 483166 | 4/1938 | United Kingdom | 277/81 R |

Primary Examiner—Robert S. Ward
Attorney, Agent, or Firm—Mark T. Basseches; Paula T. Basseches

[57] ABSTRACT

A compensating rotary seal assembly adapted to function as a substitute for a stuffing box. The seal assembly includes end plates which may be variably oriented with respect to each other by threaded bolts extending between the plates. The bolts are adjusted to compress an annular elastomeric band defining a chamber between the end plates and also effecting a driving connection between washers and the ends of a sleeve surrounding a shaft, the ends of the washers remote from the sleeve being in a sliding contact with wear surfaces on the end plates.

6 Claims, 2 Drawing Sheets

ADJUSTABLE ROTARY SHAFT SEAL

This application is a continuation-in-part of application Ser. No. 124,087, filed Dec. 23, 1987.

BACKGROUND OF THE INVENTION

1. Field of the Invention

The present invention is directed to the field of rotary seals and more particularly is directed to an adjustable compensating rotary seal assembly which functions as a substitute for or replacement of conventional compression packing devices known generally as stuffing boxes.

2. The Prior Art

As noted in the above referenced copending application, herein incorporated by reference, the conventional means for effecting a rotary seal between a prime mover and a driven component such as a pump is a stuffing box.

Stuffing boxes conventionally comprise a cylindrical chamber surrounding a shaft, the chamber being filled with convolutions of packing directly surrounding the shaft, which packings may be permeated with lubricant. A follower gland is axially slidably guided in the chamber and is controlled by adjustment bolts to apply compressive forces against the packing, which is thereby urged radially against the shaft to be sealed.

The drawbacks of stuffing boxes are well known and include the necessity for frequent readjustment of the compressive forces exerted, replacement of packing upon exhaustion of lubricant, excessive shaft wear and high torque loss. Additionally, the seal provided by a stuffing box is ineffective where the shaft exhibits significant eccentricity as respects the housing.

The above referenced pending application discloses an effective rotary seal which surmounts many of the drawbacks of conventional stuffing boxes.

Said pending application, as does the instant application, embodies certain concepts in common with U.S. patents cited in the text of the copending U.S application.

A significant problem not heretofore solved resides in the provision of a substitute for a stuffing box which, in addition to the advantages afforded by the above referenced copending application, may be adjusted for conditions in which the shaft axis between the motor and the driven component is not precisely perpendicular to the major axes of the respective components

SUMMARY OF THE INVENTION

The present invention may be summarized as directed to an improved adjustable rotary shaft seal adapted to function as a substitute for mechanical packings.

More particularly, the invention is directed to a rotary seal assembly which provides the advantages over conventional stuffing boxes embodied in the referenced copending application and which, in addition, allows adjustments over a significant range to compensate for various conditions or inaccuracies of the prime mover and driven device, and particularly inclinations and eccentricities of the shaft relative to the housings.

More specifically, the invention is directed to a rotary seal assembly which is comprised of end plates having clearance apertures formed therethrough, the plates including wear surfaces surrounding the apertures.

A tubular elastomeric sleeve adapted to be mounted on a shaft is disposed between the end plates, the distal ends of the sleeve bearing against a pair of washers, the surfaces of the washers remote from the sleeve slidably engaging the aforementioned wear surfaces.

An elongate tubular elastomeric band having end portions in sealed engagement with the end plates surrounds the aforementioned parts, to define a chamber.

Adjustment bolts spanning the end plates enable the plates to be shifted toward each other, distorting the elastomeric band, whereby the angularity of the end plates may be tailored to accommodate specific irregularities of existing machinery while maintaing a fluid-tight condition. The compressive forces of the adjustment bolts also functions to compress the washers against the sleeve to assure a driving connection between washers and sleeve and a foreshortening of the sleeve and, hence, a tight fluid seal surrounding the shaft.

The described device, which preferably is made of split components so as to permit application over an existing shaft and replacement of components without access to a shaft end, provides a long lasting, highly efficient seal.

The device need not be frequently adjusted once an appropriate setting is derived and affords a highly flexible compensating arrangement for accommodating a wide variety of irregularities in the underlying installation.

DETAILED DESCRIPTION OF THE DRAWINGS

Figure 1:
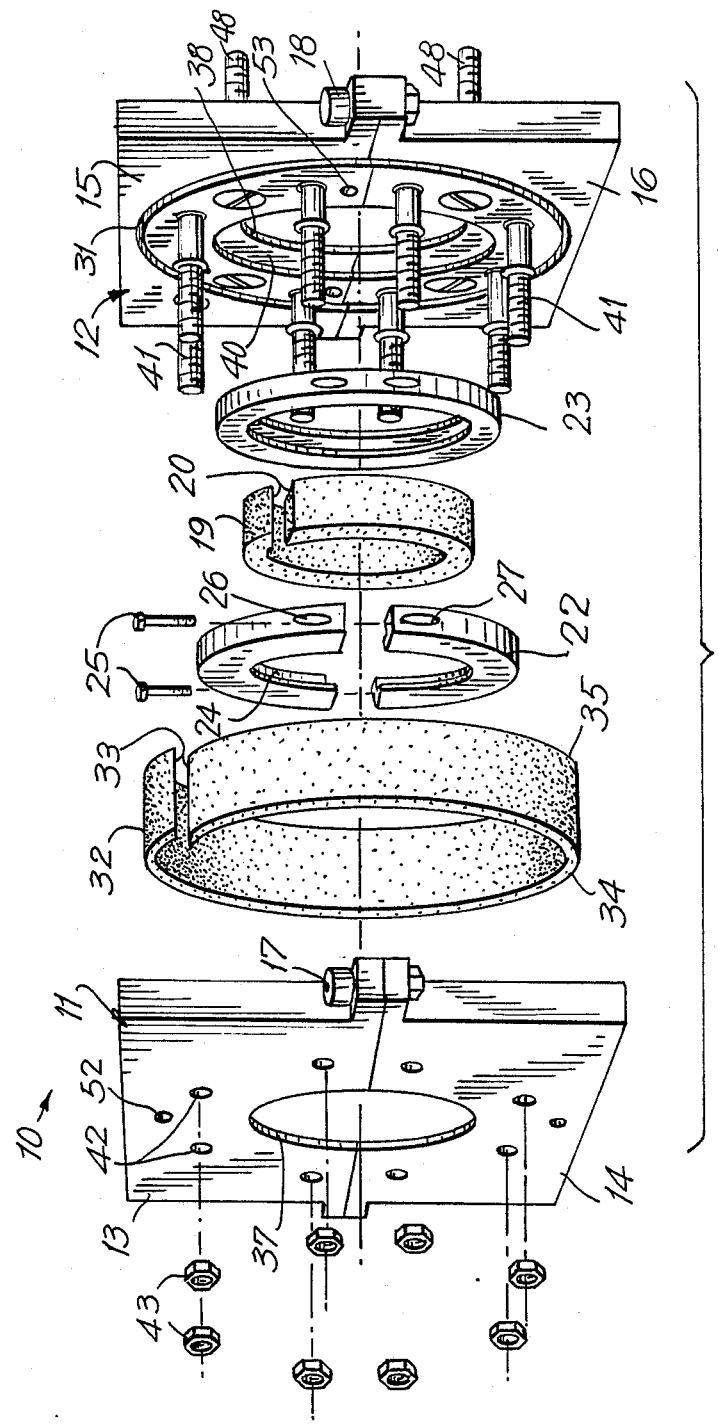
FIG. 1 comprises an exploded isometric view of a seal assembly in accordance with the invention.

An adjustable rotary shaft seal 10 is comprised of a pair of end plates 11, 12, between which are contained the remaining elements of the seal assembly. Preferably where the seal is to be mounted over an existing shaft extending between a prime mover and a driven apparatus, the various seal components are split so as to enable mounting over the shaft without necessitating exposure of an end portion of the shaft. Accordingly, the end plates 11 and 12 include upper and lower portions 13, 14, and 15, 16, respectively, the halves being interconnected as by threaded coupling assemblies, 17, 18, respectively.

The seal includes a sleeve 19 of resilient elastomeric material, i.e. neoprene, which sleeve may be formed of a single length, the distal ends 20 of which may be bonded together after the sleeve is passed about the shaft 21.

A pair of drive washers 22, 23 abut the ends of the sleeve 19, the washers preferably including annular recessed grooves 24, 24, whereby the washers overlap portions of the outer circumference of the sleeve 19. The washers 22, 23 are preferably likewise formed of split halves held together as by machine screws 25 extending through upper and lower complemental apertures 26, 27 in the halves, the lower apertures 27 being threaded or including a threaded insert for the reception of the machine screws.

The inwardly directed faces 28, 29 of the end plates 11, 12, respectively, include opposed annular grooves 30, 31, respectively, for the reception of a sealing band 32.

The band 32, which is formed of compliant elastomeric material, such as Neoprene, may likewise be formed of a single piece, the ends 33 of which are bonded together to form an annulus after assembly over the shaft.

Figure 3:
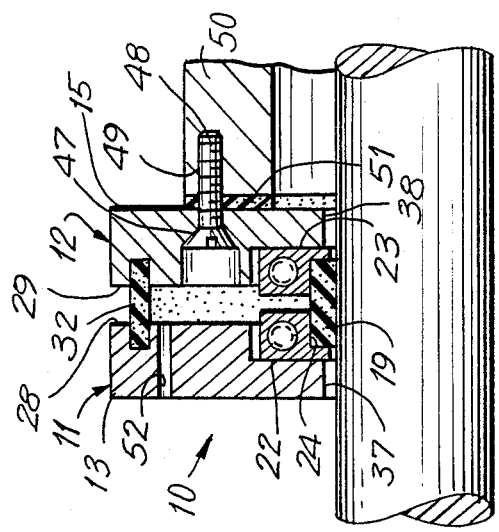
FIG. 3 is a partial sectional view similar to FIG. 1 but offset by approximately 90° showing attachment of the seal assembly to a housing.
Figure 2:
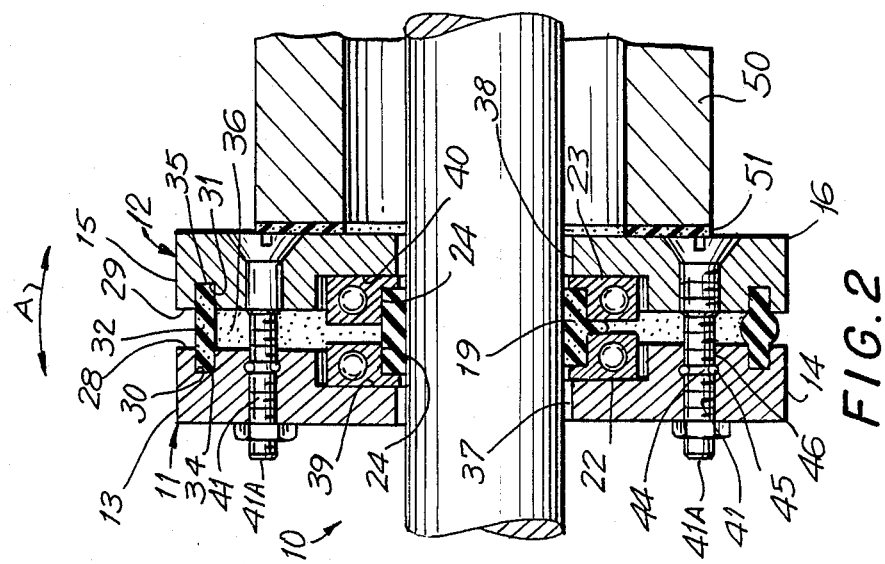
FIG. 2 comprises a vertical sectional view of the assembled seal.

The longitudinal edges 34, 35 of the band 32 lie in grooves 30, 31, as best seen from FIGS. 2 and 3, to define a chamber 36.

The end plates 11, 12 include enlarged clearance apertures 37, 38, respectively, for the passage therethrough of shaft 21.

The surfaces of the end plates surrounding the clearance apertures 37, 38 are recessed to define annular wear surfaces 39, 40, respectively.

The end plates 11, 12 are urged toward each other by a series of threaded adjustment means which, in the instant embodiment, comprise bolts 41 extending from end plate 12 through complemental apertures 42 in end plate 11, friction locks 43 being fastened over the projecting ends of the bolts 41.

The bolts include annular grooves 44 provided with O-rings 45 for assuring a seal within the bolt passages 46.

As will be apparent, the adjustment bolts 41 extend between the end plates 11, 12 at an area inwardly of band 32 and outwardly of the outer perimeter of the washers 22, 23.

End plate 12 is provided with a series of angularly offset apertures 47 for the reception of mounting bolts 48. Mounting bolts 48 are received in complemental threaded apertures 49 in the housing 50 to which the seal assembly is attached, a suitably apertured annular gasket 51 being interposed between the outer surface of end plate 12 and the face of the housing.

The interface between washers 22, 23 and end plates 11, 12 provides a low friction-low wear sliding contact. A preferred combination employs a stainless steel surface for either the end plates or the washers and an anti-friction polymer for the other of the components, whereby the interface between the washers and end plates is a polymer to metal interface. Preferred polymers include nylon, Teflon or a like wear-resistant, anti-friction polymer.

The device is shown in assembled condition in FIGS. 2 and 3.

The seal functions, from the standpoint of flow prevention, essentially in the same manner as the above referenced pending application. Specifically, sleeve 19 prevents flow along the surface of the shaft, and the sliding contact of the wear surfaces and washers prevents flow between the clearance apertures outwardly around the sleeve.

As will be understood by those skilled in the art, the shaft 21 often rotates in a slightly eccentric path. Similarly, the shaft does not always exit precisely perpendicularly relative to the housings from which the shaft extends. Conventional stuffing boxes are unable to accommodate significant conditions of eccentricity or non-perpendicularity. Accordingly such devices typically may leak or bind.

The seal assembly of the instant invention provides for relative adjustment in the direction, for example, of arrow A (FIG. 2). The assembled apparatus depicted in FIG. 2 is shown to have been adjusted to accommodate a degree of inclination of shaft 21 relative to the housing to which it is connected. Such accommodation is made possible through the use of band 32 which, in effect, defines a flexible chamber 36.

In FIG. 2 the lowermost adjustment bolt or bolts 41a have been drawn tighter, compressing the band 32 at the lower portion of the seal, as contrasted with the compression to which the band is subjected at the upper portion of the seal. In this manner a tilting of the shaft in an upward direction as viewed from right to left, FIG. 2, may be accommodated without binding. Such tilting is also accommodated at the interface of the shaft and sleeve 19, due to the elasticity of the sleeve.

From the foregoing it will be perceived that the seal of the instant invention is capable of accommodating not merely eccentricities of the shaft (as was possible with the above referenced copending application) but also can accommodate a degree of non-perpendicularity of the shaft relative to the housings to which the seal assembly is secured.

Eccentricities are compensated for by the ability of the washers 22, 23 to shift radially relative to the end plates 11, 12, the seal being defined by the sliding interface between washers and wear surfaces.

Optionally the seal may include input and output purge ports 52, 53 for the circulation of cooling fluids in chamber 36.

A highly desirable feature of the instant seal is the ability to utilize the seal to retrofit a prior stuffing box wherein significant shaft wear has been experienced, since the seal will be spaced further from the housing than the prior stuffing box and hence over an unscored area of the shaft.

The seal has the further advantage of extreme economy since the flexible or distortable housing defined by the surrounding band is far less expensive than the telescoping housings of which conventional stuffing boxes are comprised.

For conventional installations, the band has the additional advantage of acting as a gauge to guide the installer in appropriate tightening of the adjustment bolts, final adjustment being effected to prevent leakage.

As will be apparent to those skilled in the art familiarized with the instant disclosure, numerous variations in details of construction may be effected without departing from the spirit of the invention. Accordingly the same is to be broadly construed within the scope of the appended claims.

Having thus described the invention and illustrated its use, what is claimed as new and is desired to be secured by Letters Patent is:

1. A compensating rotary shaft seal assembly comprising in combination, an elongate, axially expansible, high friction elastomeric sleeve adapted to be mounted in sealing and encompassing relation over a shaft, first and second spaced washers engaging the distal ends of said sleeve, first and second spaced end plates having clearance apertures for the passage therethrough of said shaft, said end plates including annular wear surfaces surrounding said clearance apertures, said wear surfaces being in sliding engagement with the respective surfaces of said washers remote from said sleeve, a tubular elastomeric band member interposed between said end plates in encompassing relation of said sleeve and washers and surrounding said clearance apertures, the end surfaces of said band member being disposed in sealing contact with the respective opposed faces of said end plates to define with said end plates a chamber, and a plurality of threaded adjustment means extending between said end plates at angularly offset positions surrounding said wear surfaces for compressing said band member to vary the spacing between and the angular orientation of said end plates and biasing said wear surfaces against said washers.

2. Apparatus in accordance with claim 1 wherein said threaded adjustment means comprise bolts extending between said end plates in an area radially inwardly of said band and outwardly of said wear surfaces.

3. A seal assembly in accordance with claim 2 wherein said washers are formed of one material and said end plates are comprised of a second material, one of said first and second materials consisting essentially of an anti-friction polymeric material and the other of said first and second materials consisting essentially of metal.

4. Apparatus in accordance with claim 2 wherein said washers, band and sleeve are split whereby they are adapted to be mounted over said shaft without access to an end portion thereof.

5. Apparatus in accordance with claim 2 wherein said end plates include annular grooves on the opposed surfaces thereof and the distal ends of said band are disposed within said grooves.

6. Apparatus in accordance with claim 5 wherein said washers include opposed, axially directed flange portions encompassing external surfaces of said sleeve adjacent said ends.

* * * * *